April 27, 1965   L. H. FOX   3,180,166
GEAR SELECTOR CONTROL MECHANISMS
Filed March 19, 1963
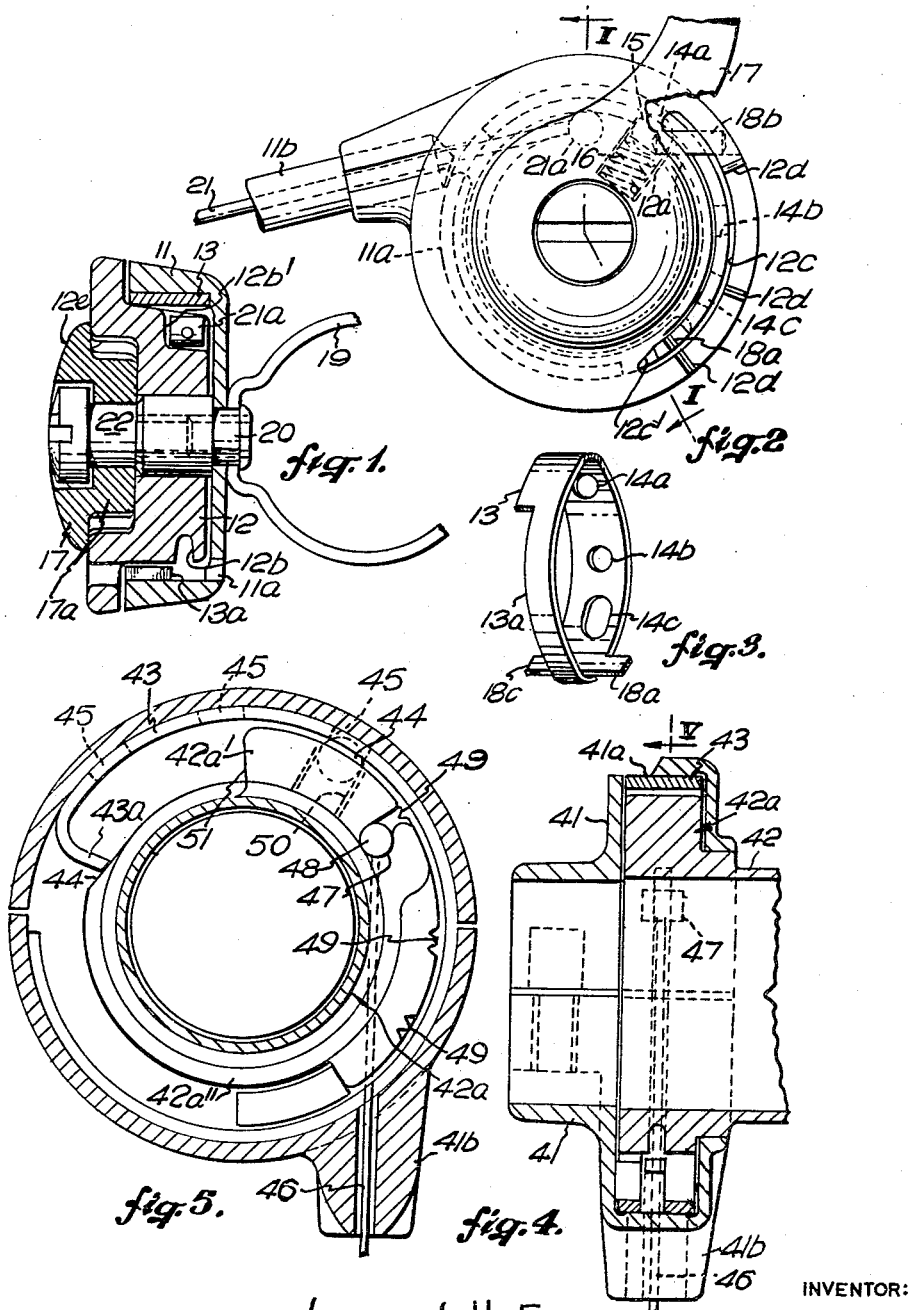
INVENTOR:
Leonard H. Fox
BY Bierman & Bierman
Attorneys United States Patent Office 3,180,166
Patented Apr. 27, 1965

3,180,166
GEAR SELECTOR CONTROL MECHANISMS
Leonard Haydn Fox, Nottingham, England, assignor to Raleigh Industries Limited, a company of Great Britain
Filed Mar. 19, 1963, Ser. No. 266,412
Claims priority, application Great Britain, Mar. 29, 1962, 12,024/62
16 Claims. (Cl. 74—489)

The invention concerns cable control mechanisms and has particular though not exclusive reference to such mechanisms as are utilised for the control of change-speed gear assemblies of bicycles or the like.

In order to operate a bicycle change-speed gear assembly satisfactorily at all times ideally it is necessary that means be provided whereby the assembly may be maintained in adjustment in spite of variations in length of the control cable due, for example, to the stretching thereof. In practice however, hithertofore, it has only been possible to effect readjustment by varying the effective length of the control cable by adjustment at the gear hub or at the trigger control and in consequence such readjustment is made as a conscious, periodic operation.

It is among the objects of the present invention to provide a cable control mechanism whereby adjustment may be effected automatically during normal usage of the mechanism and without any conscious effort from the user.

According to the present invention a cable control mechanism comprises a housing, a cable drum rotatably supported by the housing and adapted linearly to displace the cable carried thereby upon rotation relative to the said housing, a resilient ring member between the drum and housing and frictionally engaged with one such element, co-operating detent formations in the other such element and the ring member, and co-operating abutment means on the ring member and on the said other such element adapted, at one end of the range of movement of the drum relative to the housing, to displace the ring member about the axis of the drum.

According to a preferred feature of the invention the cable control mechanism also includes further co-operating abutment means on the ring member and the other such element adapted to increase the frictional resistance to movement of the ring member relative to that element with which it is in engagement at the other end of the said range of movement.

In one embodiment of the invention the cable control mechanism includes a housing adapted to be secured in position upon a support element, for example the handle-bars of a bicycle, a cable drum rotatably mounted in said housing, a resilient ring member disposed between the housing and the periphery of the cable drum so as to be in frictional engagement with the said housing, co-operating detent formations on said ring member and said drum whereby predetermined angular displacements of the drum relative to the ring member may be indicated, means whereby the cable drum may be rotated relative to the said housing, and co-operating abutment means on the ring member and on the cable drum or a part rotatable therewith whereby the ring member may be caused to be displaced about the axis of the drum at one end of the range of movement of the cable drum relative to the housing thus automatically to effect a requisite adjustment of the mechanism.

The invention will now be described further, by way of example only, with reference to the accompanying drawings illustrating two particular embodiments thereof and in which:

FIG. 1 is a transverse cross-section taken through a trigger control mechanism according to the present invention and corresponds to a section along line I—I of FIG. 2;

FIG. 2 is a plan view, partly cut away, of the mechanism of FIG. 1;

FIG. 3 is a perspective view, to a larger scale, of the gear locating ring of FIGS. 1 and 2;

FIG. 4 is a longitudinal section taken through a twist grip assembly; and

FIG. 5 is a section along line V—V of FIG. 4.

Referring now to the drawings, and in particular to FIGS. 1 to 3 thereof, the gear control mechanism according to the invention comprises a cup-shaped housing 11, a cable drum 12 located in said housing 11 and rotatably mounted relative thereto, a ring member 13 disposed about the periphery of the cable drum 12 and lying between such periphery and frictionally held in the housing 11, three angularly spaced detents 14a, 14b, 14c in said ring member 13, a detent member 15 mounted in the cable drum for motion radially thereof under the control of a helical compression spring 16 located in a radially directed hole 12a in said drum, a trigger handle 17 whereby the cable drum 12 may be caused to be rotated relative to the trigger housing, and co-operating abutment means 18a and 18b on the ring member 13 and on the cable drum 12 respectively whereby the ring member may be caused to be angularly displaced thus to effect an appropriate adjustment.

The housing 11 is secured upon an appropriate support structure, not shown, by a clip 19, the said clip 19 being secured to the housing by means of a drum pivot pin 20 passing radially through the clip 19 and being riveted at the inner surface thereof.

The cable drum 12 has a peripheral channel 12b therein to receive the cable 21, the said channel 12b having an enlargement 12b' to accommodate the securing nipple 21a of the cable 21. An arcuate slot 12c is provided in spaced disposition relative to the edge of the drum, such slot being of approximately 110° arcuate extent. The surface of the drum has legends 12d applied thereto at predetermined intervals along the length of the slot 12c, such intervals corresponding to the angular movement of the drum necessary to effect engagement of successive gears of the gear assembly being controlled. The end of slot 12c adjacent the legend corresponding to the high gear of the gear assembly has the inner edge thereof inclined, as at 12c', for a purpose yet to be made apparent.

A recess 12e is provided at the outer plane face of the drum such recess being splined or similarly formed, and serves to receive the barrel portions 17a of the trigger handle 17, the said portion 17a having lugs thereon to engage the splines in the said recess.

The ring member 13 is so dimensioned as to be an interference fit within the trigger housing and the said member 13 presents oppositely directed axial protuberances one of which constitutes the abutment means 18a, the co-operating abutment means 18b being formed by a dowel pin positioned transversely of one end of the slot 12c. When the mechanism is assembled the protuberance which forms the abutment means 18a extends through the arcuate slot 12c into a position in which it will be contacted by the co-operating abutment means 18b upon relative rotation between the handle and the housing in the appropriate sense and to an adequate extent.

The ring member is cut away as shown at 13a in FIG. 3 to facilitate the exit of the cable 21 through the trigger housing 11. Protuberance 18c acting in an arcuate slot 11a in body 11 acts as a transverse limit for the ring member 13 in order that there will be no interference between the said member and the cable during usage of the trigger mechanism.

To assemble the mechanism the trigger housing 11 is secured to the clip 19 by means of the drum pivot pin 20, the cable 21 is engaged with the cable boss 11b of the trigger housing with the nipple thereof positioned in the enlarged portion 12b' of the peripheral channel in the cable drum, the ring member 13 is positioned in the housing, and the cable drum is mounted upon the drum pivot pin 20. The trigger handle 17 is positioned in the recess in the cable drum, in an appropriate angular position relative thereto, and the whole assembly secured together by means of the locking screw 22.

The operation of the mechanism is as follow:

If the gear is correctly adjusted the abutment means 18a will lie against the appropriate legend 12d and in low gear the co-operating abutment means 18b will lie immediately adjacent the means 18a.

If the gear assembly moves out of adjustment and the cable becomes slack, readjustment will have to be effected with the assembly in low gear. In the embodiment described such readjustment is effected by moving the trigger handle 17 towards and through the low gear position until the co-operatnig abutment means 18b moves into contact with the abutment means 18a in such manner that it applies an inwardly directed force to the said member 18a thus reducing frictional resistance to relative motion between the ring member 13 and the housing and angularly displaces such means 18a, and thus the ring member 13, until the cable is taut, such condition corresponding to the correct adjustment for low gear. Detent members 14a, 14b are both of circular form whereas member 14c is elongated in order that there will be no radially outwardly directed pressure such as would result from a displacement of the ball 15 by disengagement of such ball from the detent. Upon release of pressure on the handle 17, and the return motion of such handle to the positions corresponding to the other gear selections the ring member 13 remains fixed in position relative to the trigger housing and thus the assembly remains in adjustment.

In order to avoid displacing the ring member 13 when the trigger handle 17 is moved beyond the high gear position, the slot 12c is provided with the inclined portion 12c'. It will immediately be apparent that if the abutment member 18a contacts the inclined portion 12c', the ring member 13 in the region of the member 18a will be pressed against the trigger housing and the frictional resistance to relative motion between the ring member 13 and the housing will be considerably increased and will, in normal circumstances, prevent such motion. Thus it will be seen that the mechanism will allow of the automatic adjustment of the gear assembly when the trigger handle corresponds to a low gear position of the mechanism but that such adjustment will not be disturbed upon displacement of the trigger handle to the high gear position or beyond.

When, due to having made adjustments, the position of the handle becomes inconvenient to the operator the said handle may be disengaged from the drum and re-engaged therewith at a different angular position of the operator's choosing.

The embodiment hereinbefore described may be modified, if desired, in a variety of ways.

For example, the abutment means 18b may equally well be constituted by the trigger handle itself and if desired the appropriate part of the handle may be shaped to apply a radially inwardly directed force to the abutment member 18a thus to reduce the frictional resistance to relative motion between the ring member and the housing to facilitate adjustment. It shall be understood, however, that if this construction is followed the adjustment of the handle relative to the drum will be precluded.

In a modified embodiment the back of the housing will be cut away to provide easier engagement of the cable and nipple with the channel 12b and the enlargement 12b' thereto respectively. By suitably dimensioning the cut away portion it may be arranged that the nipple during usage of the mechanism, will be in a position out of alignment therewith and thus inadvertent disengagement will be avoided. Furthermore, the slot 11a of the embodiment hereinbefore described will be formed as a continuation to the cutout before referred to and will be so positioned upon the housing as to be substantially in correspondence with the slot 12c therein, the position of the protuberance being altered accordingly.

The present invention is also applicable to twist grip controls and such a control is illustrated in FIGS. 4 and 5 of the drawings.

Referring now to FIGS. 4 and 5, the twist grip control comprises a two part housing 41 adapted to be clamped about the handlebars of a bicycle or the like, a twist grip 42 rotatably mounted at its end, in such housing and co-axially with the end of the handlebars, a resilient ring member 43 positioned in the housing and between such housing and the end of the twist grip 42, and a detent member 44 carried by the grip 42 and adapted successively to engage detents 45 in the said ring member 43.

The housing 41 has an arcuate slot 41a in the periphery thereof and is also formed with a cable boss 41b.

The twist grip 42 is tubular and is so dimensioned as to be engageable with the end of a bicycle handlebar. The inner end of the twist grip 42 is provided with a radially outwardly directed flange 42a, such flange corresponding to the drum 12 of the embodiment of FIGS. 1 to 3, and extending around approximately 280° of arc. The radial extent of the flange 42a varies, through its arcuate extent. Initially, as at 42a' the flange 42a is of such radial dimensions as to extend almost to the inner face of the ring member 43, the flange maintaining such dimension over approximately 150° of arc, but the radial extent then decreases to remain constant at a low figure, as at 42a'', for a further 130°, finally terminating in an inclined vamp 44. A channel is cut in the flange 42a to receive a control cable 46, the channel terminating in an enlargement 47 to receive the cable nipple 48 in usual manner. Indication legends 49 are marked on the periphery of the flange portion 42a', such legends corresponding to the gear settings, when the gear is in adjustment, and being visible through the slot 41a in the housing 41.

The detent member 44 is located in a radial blind hole 50 in the flange portion 42a' and is spring loaded into engagement with the detents 45 in the ring member 43 in conventional manner.

The ring member 43 extends through approximately 330° of arc and has one end thereof so bent as to form a tail 43a extending radially inwardly of the member.

A slot, not shown, is cut in the periphery of the ring member over such arcuate extent as is required to avoid interference between the ring and the cable during usage, and an edge of the ring member is cutaway to render the legends 49 on the flange 42a visible through the slot 41a.

The operation of the twist grip is analogous to that of the embodiment described with reference to FIGS. 1 to 3 and thus little further description is thought to be necessary. Adjustment of the gear, in low gear as before, is effected by the abutment of the end face 51 of the flange portion 42a' with the tail 43a whilst displacement of the ring member in the high gear position is prevented by the outward radial pressure applied to the tail 43a by the ramp 44.

It is to be appreciated that in some instances the drum may extend outside the housing, the ring member being located and arranged against the outer periphery of the housing or an inner periphery of the drum, the co-operating detent means being formed in the ring and in that element which does not support the ring member. It is to be observed, of course, that when the ring member is disposed about the housing in these circumstances, the frictional resistance to motion for adjustment purposes will be reduced by applying a radially outwardly directed force, whereas at the opposite end of the range of movement the frictional resistance will be increased by the application of a radially inwardly directed force.

What I claim is:

1. A cable control mechanism which comprises a housing member, a cable drum member rotatably supported by the housing adapted to displace the cable carried thereby upon rotation relative to the said housing, a resilient ring member between the drum member and housing member and frictionally engaged with one of said members, co-operating detent formations in the other of said members and the ring member, and co-operating abutment means on the ring member and on the said other member adapted, at one end of the range of movement of the drum relative to the housing, to displace the ring member about the axis of the drum.

2. A cable control mechanism as claimed in claim 1 including further co-operating abutment means on the ring member and the other member adapted to increase the frictional resistance to movement of the ring member relative to that element with which it is in engagement at the other end of the said range of movement.

3. A cable control mechanism as claimed in claim 2 wherein means are provided to decrease the frictional resistance to displacement of the ring member relative to the housing at the said one end of the range of movement.

4. A cable control mechanism as claimed in claim 1 wherein means are provided to decrease the frictional resistance to displacement of the ring member relative to the housing at the said one end of the range of movement.

5. A cable control mechanism which includes a housing adapted to be secured in position upon a support element, a cable drum rotatably mounted in said housing, a resilient ring member disposed between the housing and the periphery of the cable drum so as to be in frictional engagement with the said housing, co-operating detent formations on said ring member and said drum whereby predetermined angular displacements of the drum relative to the ring member may be indicated, means whereby the cable drum may be rotated relative to the said housing, and co-operating abutment means on the ring member and on the cable drum or a part rotatable therewith whereby the ring member may be caused to be displaced about the axis of the drum at one end of the range of movement of the cable drum relative to the housing thus automatically to effect a requisite adjustment of the mechanism.

6. A cable control mechanism as claimed in claim 5 including co-operating abutment means on the drum and ring member adapted to increase the frictional resistance to motion of the ring member relative to the drum at the opposite end of the range of movement of the drum.

7. A cable control mechanism as claimed in claim 5 wherein the co-operating abutment means includes a tag on the ring member and an inclined surface on the drum so directed as to apply a radially outwardly directed force to the tag upon abutment of the tag with such surface.

8. A cable control mechanism as claimed in claim 7 wherein the inclined surface is defined by a ramp on the drum.

9. A cable control mechanism which includes a housing adapted to be secured in position upon a support element, a cable drum rotatably mounted in said housing, a resilient ring member disposed between the housing and the periphery of the cable drum so as to be in frictional engagement with the said housing, co-operating detent formations on said ring member and said drum whereby predetermined angular displacements of the drum relative to the ring member may be indicated, means whereby the cable drum may be rotated relative to the said housing, and first co-operating abutment means on the ring member and on the cable drum or a part rotatable therewith whereby the ring member may be caused to be displaced about the axis of the drum at one end of the range of movement of the cable drum relative to the housing thus automatically to effect a requisite adjustment of the mechanism, including further co-operating abutment means on the drum and ring member adapted to increase the frictional resistance to motion of the ring member relative to the drum at the opposite end of the range of movement of the drum, the said first co-operating abutment means being adapted to reduce the frictional resistance to displacement of the ring member relative to the housing at the said one end of the range of movement.

10. A cable control mechanism as claimed in claim 9 wherein the further co-operating abutment means includes a tag on the ring member and an inclined surface on the drum so directed as to apply a radially outwardly directed force to the tag upon abutment of the tag with such surface.

11. A cable control mechanism as claimed in claim 10 wherein the first co-operating abutment means is adapted to reduce the frictional resistance to displacement of the ring member relative to the housing at the said one end of the range of movement, the said first abutment means including a tag on the ring and an inclined surface at the drum so positioned as to lie in the path of the tag.

12. A cable control mechanism as claimed in claim 11 further including indicator means, such means comprising a further tag on the ring member and a plurality of legends on the drum.

13. A cable control mechanism which includes a housing adapted to be secured in position upon a support element, a cable drum rotatably mounted in said housing, a resilient ring member disposed between the housing and the periphery of the cable drum so as to be in frictional engagement with the said housing, co-operating detent formations on said ring member and said drum whereby predetermined angular displacements of the drum relative to the ring member may be indicated, means whereby the cable drum may be rotated relative to the said housing, and first co-operating abutment means on the ring member and on the cable drum or a part rotatable therewith whereby the ring member may be caused to be displaced about the axis of the drum at one end of the range of movement of the cable drum relative to the housing thus automatically to effect a requisite adjustment of the mechanism, the said first co-operating abutment means being adapted to reduce the frictional resistance to displacement of the ring member relative to the housing at the said one end of the range of movement.

14. A cable control mechanism as claimed in claim 13 wherein the said first co-operating abutment means includes a tag on the ring and an inclined surface at the drum so positioned as to lie in the path of the tag.

15. A cable control mechanism as claimed in claim 14 wherein the said surface is defined by a peg.

16. A cable control mechanism which includes a housing adapted to be secured in position upon a support element, a cable drum rotatably mounted in said housing, a resilient ring member disposed between the housing and the periphery of the cable drum so as to be in frictional engagement with the said housing, co-operating detent formations on said ring member and said drum whereby predetermined angular displacements of the drum relative to the ring member may be indicated, means whereby the cable drum may be rotated relative to the said housing, first co-operating abutment means on the ring member and on the cable drum or a part rotatable therewith whereby the ring member may be caused to be displaced about the axis of the drum at one end of the range of movement of the cable drum relative to the housing thus automatically to effect a requisite adjustment of the mechanism, further co-operating abutments means on the drum and ring member adapted to increase the frictional resistance to motion of the ring member relative to the drum at the opposite end of the range of movement of the drum, and indicator means for indicating the relevant setting of the mechanism, the first abutment means being adapted to reduce the frictional resistance to displacement of the ring member relative to the housing at the said one end of the range of movement, the said indicator means comprising a further tag on the ring member and a plurality of legends on the drum.

References Cited by the Examiner
UNITED STATES PATENTS
2,466,363   4/49   Bodinaus et al. _____ 74—489
FOREIGN PATENTS
315,497   9/56   Switzerland.

BROUGHTON G. DURHAM, *Primary Examiner*.